US006377257B1

United States Patent
Borrel et al.

(10) Patent No.: US 6,377,257 B1
(45) Date of Patent: Apr. 23, 2002

(54) METHODS AND APPARATUS FOR DELIVERING 3D GRAPHICS IN A NETWORKED ENVIRONMENT

(75) Inventors: Paul Borrel, White Plains; Shawn Hall, Pleasantville; William P. Horn, Scarsdale; James T. Klosowski, Rye; William L. Luken, Yorktown Heights; Ioana M. Martin, Mohegan Lake; Frank Suits, Garrison, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,313

(22) Filed: Oct. 4, 1999

(51) Int. Cl.⁷ ............................................... G06T 17/00

(52) U.S. Cl. ....................... 345/419; 345/421

(58) Field of Search ............................ 345/418, 419, 345/420, 423, 424, 425, 421

(56) References Cited

U.S. PATENT DOCUMENTS

| 4,737,921 A | 4/1988 | Goldwasser et al. |
| 5,408,272 A | 4/1995 | Barnett et al. |
| 5,696,948 A | 12/1997 | Cruz et al. |
| 5,729,669 A | 3/1998 | Appleton |

OTHER PUBLICATIONS

B. Schneider et al., "An Adaptive Framework for 3D Graphics in Networked and Mobile Environments", Proc. Workshop on Interactive Applications of Mobile Computing, IMC'98, Nov. 1998.

Y. Mann et al., "Selective Pixel Transmission for Navigating in Remote Virtual Environments", Proc. Eurographics '97, vol. 16, No. 3, 1997.

M. Levoy, "Polygon–Assisted JPEG and MPEG Compression of Synthetic Images", ACM Proc. Siggraph '95, Aug. 1995, pp. 21–28.

D. Aliaga, et al., "Architectural Walkthroughs Using Portal Textures", IEEE Visualization '97, pp. 355–362, Oct. 1997.

Luken et al., "PanoramIX: Photorealistic Multimedia 3D Scenery", IBM Research Report #RC21145, IBM T.J. Watson Research Center, 1998.

(List continued on next page.)

*Primary Examiner*—Cliff N. Vo
(74) *Attorney, Agent, or Firm*—Whitham, Curtis & Christofferson, P.C.; Louis J. Percello

(57) ABSTRACT

A system and method for seamlessly combining client-only rendering techniques with server-only rendering techniques. The approach uses a composite stream containing three distinct streams. Two of the streams are synchronized and transmit camera definition, video of server-rendered objects, and a time dependent depth map for the server-rendered object. The third stream is available to send geometry from the server to the client, for local rendering if appropriate. The invention can satisfy a number of viewing applications. For example, initially the most relevant geometry can stream to the client for high quality local rendering while the server delivers renderings of less relevant geometry at lower resolutions. After the most relevant geometry has been delivered to the client, the less important geometry can be optionally streamed to the client to increase the fidelity of the entire scene. In the limit, all of the geometry is transferred to the client and the situation corresponds to client-only rendering system where local graphics hardware is used to improve fidelity and reduce bandwidth. Alternatively, if a client does not have local three-dimensional graphics capability then the server can transmit only the video of the server-rendered object and drop the other two streams. In either case, the approach also permits for a progressive improvement in the server-rendered image whenever the scene becomes static. Bandwidth that was previously used to represent changing images is allocated to improving the fidelity of the server-rendered image whenever the scene becomes static.

38 Claims, 13 Drawing Sheets

OTHER PUBLICATIONS

H. Zhang et al., "Visibility Culling Using Hierarchical Occlusion Maps", ACM Proc. Siggraph '97, Aug. 1997, pp. 77–88.

D. Aliaga, et al., "Visualization of Complex Models Using Dynamic Texture–based Simplification", IEEE Visualization '96, pp. 101–1063, Oct.–Nov. 1996.

Garland, et al, "Surface Simplification Using Quadric Error Metrics", ACM Proc. Siggraph '97, Aug. 1997, pp. 209–216.

H. Hoppe, "Progressive Meshes", ACM Proc. Siggraph '98, Aug. 1996, pp. 99–108.

G. Taubin, et al., "Progressive Forest Split compression", ACM Proc. Siggraph '98, Jul. 1998, pp. 123–132.

G. Taubin, et al., "Geometric Compression Through Topological Surgery", ACM Transactions on Graphics, vol. 17, No. 2, Apr. 1998, pp. 84–115.

W. Meloni, "The Web Looks Toward 3D" Computer Graphics World, 21(12), Dec. 1998, p. 20.

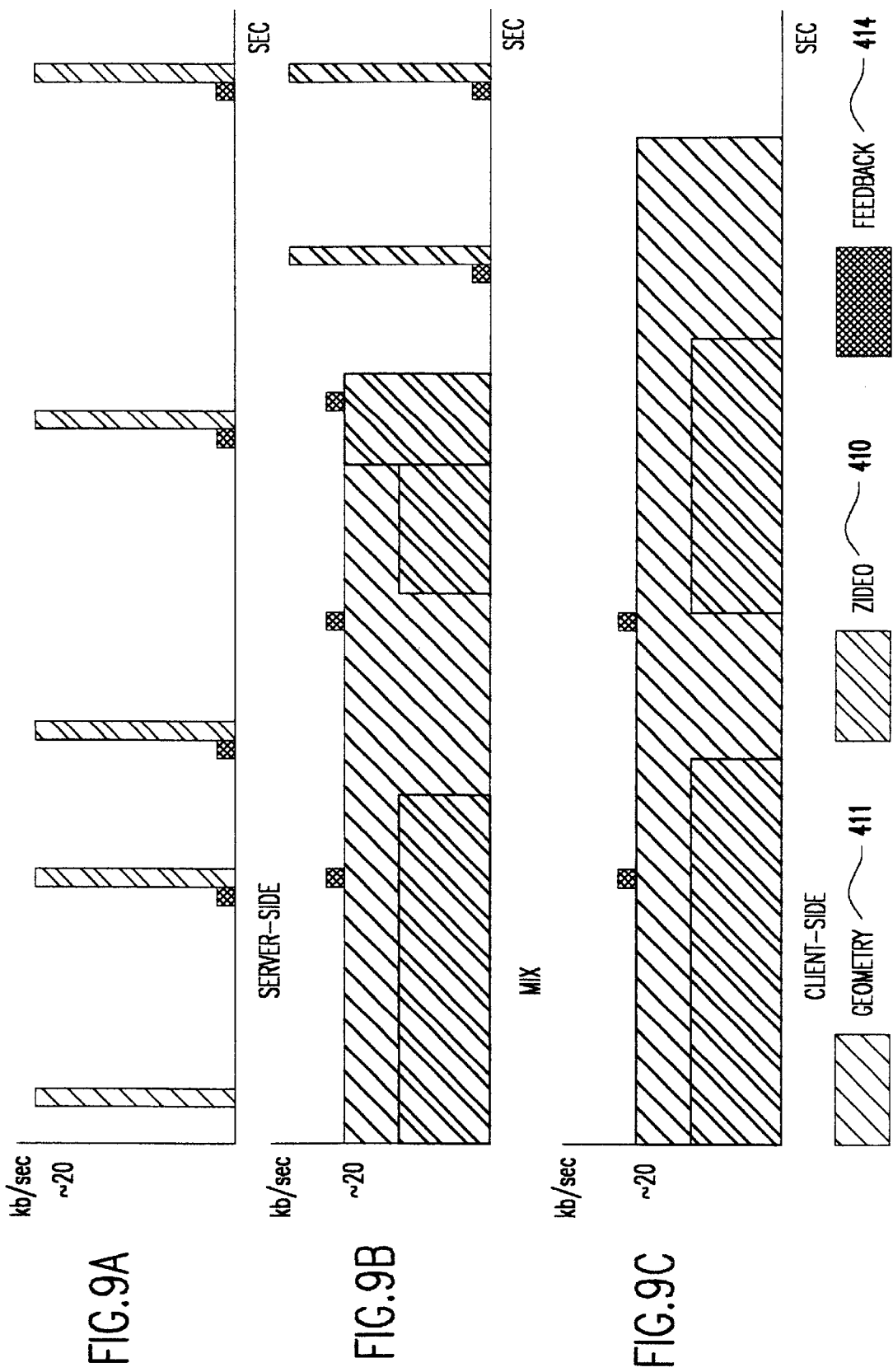

METHODS AND APPARATUS FOR DELIVERING 3D GRAPHICS IN A NETWORKED ENVIRONMENT

CROSS-REFERENCE TO RELATED APPLICATION

The subject matter of this application is related to the disclosure of co-pending U.S. patent application Ser. No. 09/411,312 filed Oct. 4, 1999, by Paul Borrel, Shawn Hall, William P. Horn, James T. Klosowski, William L. Luken, Ioana M. Martin, and Frank Suits for "Methods and Apparatus for Delivering 3D Graphics in a Networked Environment Using Transparent Video" and assigned to a common assignee herewith. The disclosure of co-pending U.S. patent application Ser. No. 09/411,312 is incorporated herein by reference.

DESCRIPTION

BACKGROUND OF THE INVENTION

1. Field of the Invention

The present invention generally relates to graphics processing and display systems and, more particularly, to the creation and presentation of three-dimensional scenes of synthetic content stored on distributed network sources and accessed by computer network transmission. The invention further relates to methods of adaptively selecting an optimal delivery strategy for each of the clients based on available resources.

2. Background Description

Using three-dimensional graphics over networks has become an increasingly effective way to share information, visualize data, design components, and advertise products. As the number of computers in the consumer and commercial sectors with network access increases, the number of users accessing some form of three-dimensional graphics is expected to increase accordingly. For example, it has been estimated by W. Meloni in "The Web Looks Toward 3D", *Computer Graphics World*, 21(12), December 1998, pp. 20 et seq., that by the end of year 2001, 152.1 million personal computers (PCs) worldwide will have an Internet connection. Out of this number, approximately 52.3 million users will frequently access three-dimensional images while on the World Wide Web (WWW or the Web). This number compares to only 10 million users accessing three-dimensional Web images in 1997 out of a total of 79 million Internet users. However, the use of three-dimensional graphics over networks is not limited to consumer applications. In 1997, roughly 59% of all U.S. companies had intranet connections. By 2001 this figure is expected to jump to 80%. This transition includes three-dimensional collaboration tools for design and visualization. For instance, within the computer-aided design (CAD) community there is significant interest in applications which permit sharing on a global basis of three-dimensional models among designers, engineers, suppliers and other interested parties across a network. The capability to perform "visual collaborations" offers the promise to reduce costs and to shorten development times. Other corporate interests target the use of three-dimensional solutions to visualize data such as financial fluctuations, client accounts, and resource allocations.

As generally shown in FIG. 1, three-dimensional models and their representations are typically stored on centralized servers 100 and are accessed by clients 101 over communication networks 102. Several data-transfer technologies have been developed over the past few years to visualize three-dimensional models over networks.

At one end of the spectrum are the so-called client-side rendering methods in which the model is downloaded to the client which is entirely responsible for its rendering. FIG. 2 shows a diagram of a typical client-side rendering architecture. Upon input from a user or another application 201, the client 202 requests, via network 203 as client feedback 204, a model from the server 205. The geometry server 210 within server 205 contains the 3d geometry 211 and the scene parameters 212. In response to client feedback 204, the server 205 retrieves the model from storage 206 and delivers the 3d geometry 213 to the client 202 over the network 203. Once the model has been received by the client, the client 3d browser 208 renders it in client rendering engine 207 and displays it on the display 209. Additional client feedback may follow as the user interacts with the model displayed and more information about the model is downloaded. Such methods typically require a considerable amount of time to download and display on the client an initial meaningful representation of a complex three-dimensional model. These methods also require the existence of three-dimensional graphics capabilities on the client machines.

Alternatives to en masse downloading of a model without prior processing include storage and transmission of compressed models, as reported by G. Taubin and J. Rossignac in "Geometry Compression Through Topological Surgery", *ACM Transactions on Graphics*, April 1998, pp. 84–115, streaming and progressive delivery of the component geometry, as reported by G. Taubin et al. in "Progressive Forest Split Compression", *ACM Proc. Siggraph* '98, July 1998, pp. 123–132, H. Hoppe in "Progressive Meshes", *ACM Proc. Siggraph* '98, August 1996, pp. 99–108, and M. Garland and P. Heckbert in "Surface Simplification Using Quadric Error Bounds", *ACM Proc. Siggraph*'97, August 1997, pp. 209–216, and ordering based on visibility, as reported by D. Aliaga in "Visualization of Complex Models Using Dynamic Texture-Based Simplification", *Proc. IEEE Visualization* '96, October 1996, pp. 101–106, all of which are targeted towards minimizing the delay before the client is able to generate an initial display. However, producing such representations may involve significant server computing and storage resources, the downloading time remains large for complex models, and additional time may be necessary on the client to process the data received (e.g., decompression). For example, Adaptive Media's Envision 3D (see www.envision.com) combines computer graphics visibility techniques (e.g., occlusion culling as described by H. Zang et al., "Visibility Culling Using Hierarchical Occlusion Maps", *ACM Proc. Siggraph* '97, August 1997, pp. 77–88) with streaming to guide the downloading process by sending to the clients the visible geometry first and displaying it as it is received, rather than waiting for the entire model to be sent. Nonetheless, determining which geometry is visible from a given viewpoint is not a trivial computation and maintaining acceptable performance remains a challenging proposition even when only visible geometry is transmitted.

At the opposite end of the spectrum are server-side rendering methods, as generally shown in FIG. 3, which place the burden of rendering a model entirely on the server and the images generated are subsequently transmitted to clients. As in the case of client-side methods, the client 301 usually initiates a request for a model. However, instead of downloading the three-dimensional model to the client 301, the model and scene description 302 stored in storage 303 is rendered on the server 304 in rendering engine 305 to produce two-dimensional static images 306, and one or more two-dimensional images 307 resulting from this rendering are transmitted over the network 308 to the client 301. Subsequently, the images 307 are displayed on display 309 of the client 301. The cycle is then repeated based on user feedback 310.

Such techniques have the advantages that they do not require any three-dimensional graphics capabilities on the part of the clients and the bandwidth requirements are significantly reduced. The tradeoffs in this case are the loss of real-time interaction with the model (i.e., images cannot be delivered to clients at interactive frame rates) and the increase in server load and hence, server response times, as the number of clients concurrently accessing the server increases. An example of a server-side-based rendering system is CATWeb (www.catia.ibm.com) which is a web browser-based application designed to provide dynamic CAD data access to users with intranet connections and graphics capabilities. Another example in this category is panoramic rendering described by W. Luken et al. in "PanoramIX: Photorealistic Multimedia 3D Scenery", *IBM Research Report* #RC21145, IBM T. J. Watson Research Center, 1998. A panorama is a 360 degree image of a scene around a particular viewpoint. Several panoramas can be created for different viewpoints in the scene and connected to support limited viewpoint selection.

Hybrid rendering methods described by D. Aliaga and A. Lastra in "Architectural Walkthroughs Using Portal Textures", *Proc. IEEE Visualization '97*, October 1997, pp. 355–362, M. Levoy in "Polygon-Assisted JPEG and MPEG Compression of Synthetic Images", *ACM Proc. Siggraph '95*, August 1995, pp. 21–28, and Y. Mann and D. Cohen-Or in "Selective Pixel Transmission for Navigating in Remote Virtual Environments", *Proc. Eurographics '97*, 16 (3), September 1997, pp. 201–206, provide a compromise approach by rendering part of a complex model on the server (usually components that are far away from the viewer or of secondary interest) and part on the client. Thus, a combination of images (possibly augmented with depth information) and geometry is delivered to the client. For example, the background of a three-dimensional scene may be rendered on the server as a panorama with depth information at each pixel. Foreground objects are delivered as geometry to the client and correctly embedded into the panorama using the depth information. The main advantage of such an approach is that the time to transmit and display on the client the server-rendered parts of the model is independent of the scene complexity, while the frame rate and the interaction with the client-rendered parts are improved. Additional processing of the image and geometry data may be done to optimize their transfer over the network. For instance, in M. Levoy, supra, image compression is applied to the two-dimensional data and model simplification and compression are performed on the three-dimensional data before they are sent to the client. Some of the disadvantages of hybrid rendering methods are the fact that determining whether a part of a given model should be rendered on the server or on the client is usually not a trivial task, extra image information is often required to fill in occlusion errors that may occur as a result of a viewpoint change on the client, and limited user interaction.

Although the subject has been addressed by B. O. Schneider and I. Martin in "An Adaptive Framework for 3D Graphics in Networked and Mobile Environments", *Proc. Workshop on Interactive Applications of Mobile Computing* (IMC'98), November 1998, in general, commercial methods for delivering three-dimensional data over networks are not adaptive. They do not take into account dynamic changes in system environment conditions such as server load, client capabilities, available network bandwidth, and user constraints. In addition, the lack of standards and the increasing complexity of the models have contributed to limiting the success of existing technologies.

SUMMARY OF THE INVENTION

It is therefore an object of the present invention to provide a system and method which provides a continuous, seamless spectrum of rendering options between server-only rendering and client-only rendering.

Another object of the invention is to provide a user-controlled tradeoff between the quality (fidelity) of the rendered image and the frame rates at which the rendered image is displayed on the client.

It is yet another object of the invention to provide a system and method which provides rendering options that adaptively track a dynamic network environment.

Yet another object of this invention is to provide a system and method that uses dead reckoning techniques to avoid latency problems in a network.

According to the invention, there is provided a novel approach to the problem of seamlessly combining client-only rendering techniques with server-only rendering techniques. The approach uses a composite stream containing three distinct streams. Two of the streams are synchronized and transmit camera definition, video of server-rendered objects, and a time dependent depth map for the server-rendered object. The third stream is available to send geometry from the server to the client, for local rendering if appropriate.

The invention can satisfy a number of viewing applications. For example, initially the most relevant geometry can stream to the client for high quality local rendering while the server delivers renderings of less relevant geometry at lower resolutions. After the most relevant geometry has been delivered to the client, the less important geometry can be optionally streamed to the client to increase the fidelity of the entire scene. In the limit, all of the geometry is transferred to the client and the situation corresponds to client-only rendering system where local graphics hardware is used to improve fidelity and reduce bandwidth. Alternatively, if a client does not have local three-dimensional graphics capability then the server can transmit only the video of the server-rendered object and drop the other two streams. In either case, as an additional feature, the approach permits for a progressive improvement in the server-rendered image whenever the scene becomes static. Bandwidth that was previously used to represent changing images is allocated to improving the fidelity of the server-rendered image whenever the scene becomes static.

BRIEF DESCRIPTION OF THE DRAWINGS

The foregoing and other objects, aspects and advantages will be better understood from the following detailed description of a preferred embodiment of the invention with reference to the drawings, in which:

FIG. 9A is a diagram illustrating server-side bandwidth requirements for the present invention;

FIG. 9B is a diagram illustrating the mixed client-side and server-side bandwidth requirements for the present invention;

FIG. 9C is a diagram illustrating client-side bandwidth requirements for the present invention;

DETAILED DESCRIPTION OF PREFERRED EMBODIMENTS OF THE INVENTION

Figure 1:
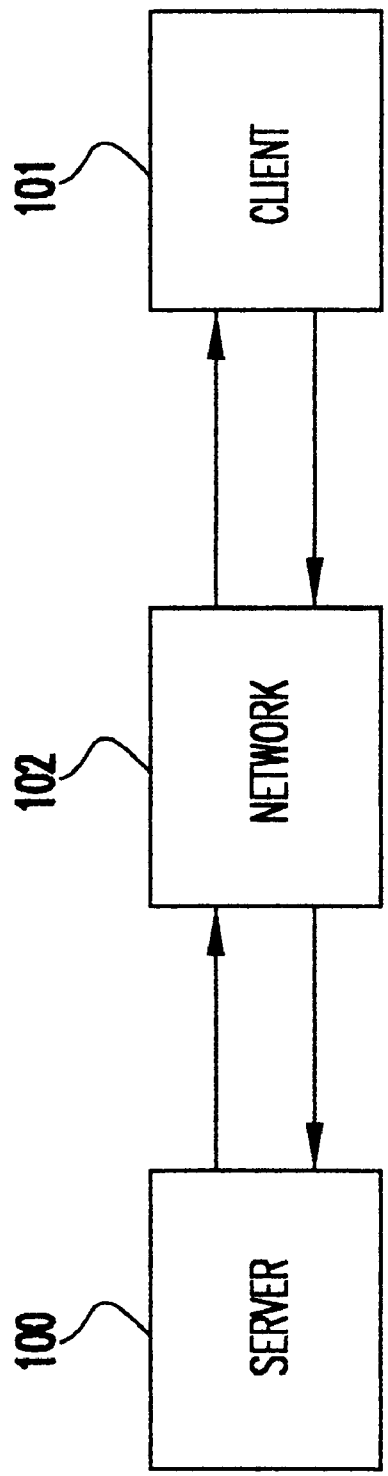
FIG. 1 is a block diagram showing a prior art client-server architecture.

This invention is a system which provides a continuous, seamless spectrum of rendering options between server-only rendering and client-only rendering. The system adaptively chooses a particular rendering option to accommodate system factors such as:

available network bandwidth, client three-dimensional graphics capabilities, central processing unit (CPU) capabilities, and CPU load;

server three-dimensional graphics capabilities, CPU capabilities, and CPU load;

display image size;

eye position used for rendering;

scene complexity (for example number of connected components, number of triangles, and so forth);

depth complexity;

division of geometry between the foreground and the background; and the number of pixels per triangle.

The present invention is a system for generating and delivering rendered images of synthetic content, consisting of one or a plurality of three-dimensional geometric models, across a computer network. The system uses a server computer and a client computer and permits the rendering of one or several geometric models on the server computer, on the client computer, or a combination of the two, for the purposes of visualizing and interacting with the three-dimensional geometric models on the client.

The approach utilizes a composite stream containing three distinct streams. Two of the streams are synchronized and are used for transmitting camera parameters, video of the server-rendered objects, and a time-dependent depth map for the server-rendered objects. The third stream is used to send geometry from the server to the client, for local rendering.

Several novel features of the present invention are the methods used by the client to perform the compositing operation. In one method, the z-buffer, or depth map, information generated by the server is compared to the z-buffer information generated by the client to decide, for each pixel in the final image, whether to use the client-rendered pixel or the server-rendered pixel. In another method, the z-buffer information is transmitted in compressed form.

The present invention is particularly useful in applications involving a large, centrally-located CAD database with many client computers of varying graphics capabilities accessing one or several models over computer networks of variable bandwidths. The invention can also be used, however, to satisfy a number of viewing applications. For example, initially the most relevant geometry can be streamed to the client for high quality local rendering, while the server delivers renderings of less relevant geometry at lower resolutions. After the most relevant geometry has been delivered to the client, the less important geometry can be optionally streamed to the client to increase the fidelity of the entire scene. In the limit, all of the geometry is transferred to the client and this situation corresponds to client-only rendering systems where local graphics hardware is used to improve fidelity and reduce bandwidth. Alternatively, if a client does not have local three-dimensional graphics capability, the server can transmit only the video of the server-rendered objects and drop the other two streams. In either case, as an additional feature, the approach permits for a progressive improvement in the server-rendered image whenever the camera is no longer being manipulated by the client, and the scene becomes static. Bandwidth that was previously used to represent changing images is allocated to improving the fidelity of the server-rendered image whenever the scene becomes static.

Figure 4:
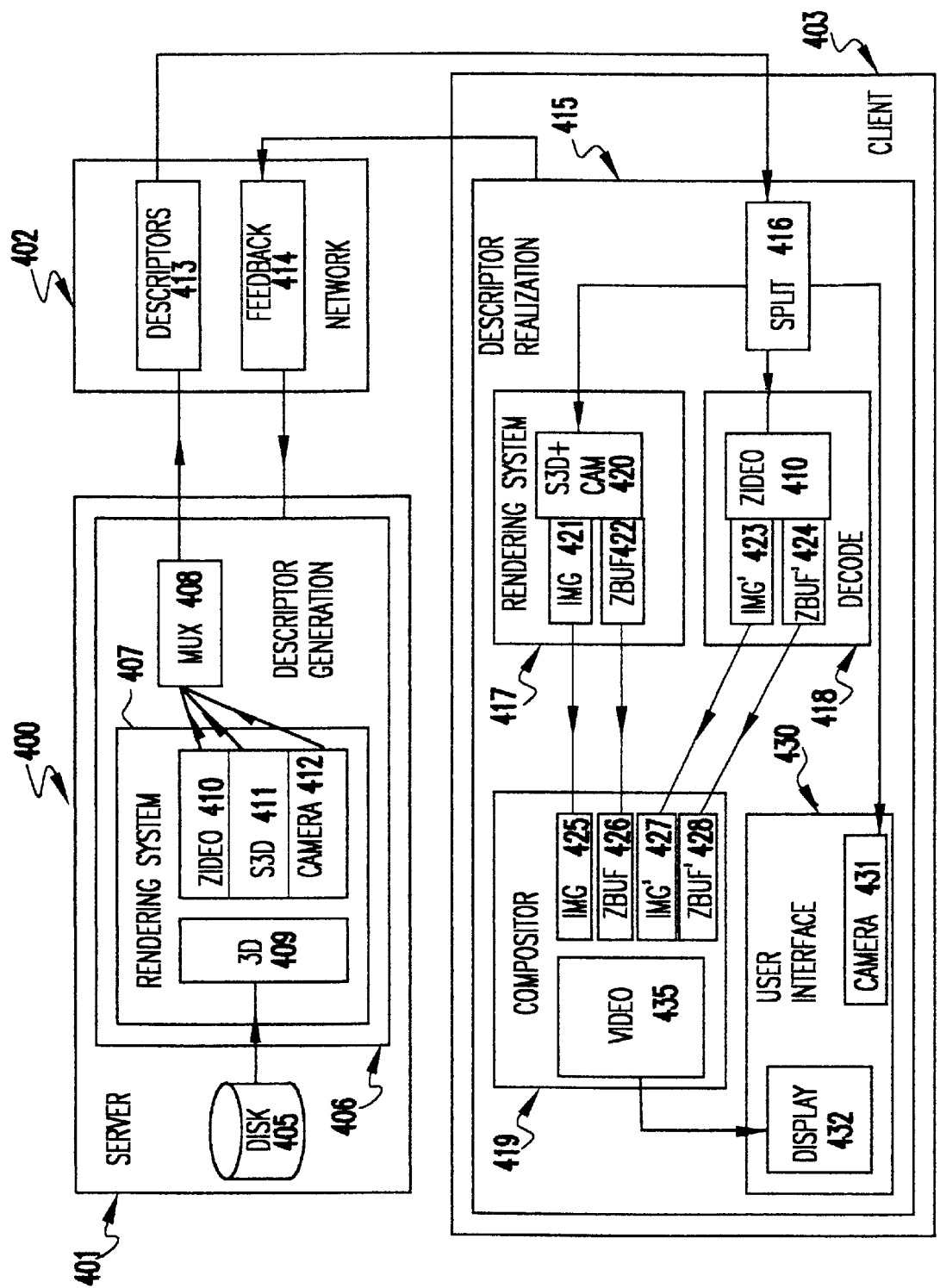
FIG. 4 is a block diagram showing an overview of a typical networking environment using the present invention.

FIG. 4 is a block diagram showing an overview of a typical networking environment using the present invention. The figure describes a system 400 comprising a server computer 401, a computer network 402, and a client computer 403. The server 401 further comprises a disk 405 where one or a plurality of geometric models are stored, and a descriptor generating system 406. The descriptor generating system 406 contains a rendering system 407 and a multiplexer 408. The rendering system 407 contains a three-dimensional facility 409 for processing scenes of three-dimensional geometric models, and feeds systems 410, 411 and 412 that support three different output types. The "zideo" system 410 generates image and related z-buffer information, also referred to as zideo, which may be compressed. Zideo information consists of video and z-buffer information. The three-dimensional system 411 generates streamed three-dimensional geometry. The camera system 412 maintains the parameters describing the camera. The server 401, and in particular the descriptor generating system 406, are described in greater detail in FIG. 5.

The network 402 in this environment is responsible for passing descriptors 413 from the server computer 401 to the client computer 403, as well as passing feedback 414 from the client computer 403 back to the server 401. Descriptors 413 is a term used to describe what is being sent from the server to the client as well as the actual data that is being transmitted. For example, the descriptors 413 can indicate that the server is sending only images, in the case of server-only rendering; only geometry, in the case of client-only rendering; or images, z-buffer information, and camera parameters, in the case of server and client rendering. The feedback 414 information that is being sent from the client 403 to the server 401 is a means for the client 403 to specify what it would like the server 401 to do. For example, the client 403 could indicate specific components of the geometric models in disk 405 that it would like the server 403 to send to it for local rendering, or it could tell the server 401 to send higher, or lower, quality images. The feedback 414 mechanism used by the present invention is described in greater detail in FIGS. 6 and 7.

A descriptor realization system 415 resides on the client computer 403, where the descriptors 413, sent via the network 402, are utilized to visualize the synthetic content. The descriptor realization system 415 consists of a demultiplexer 416, which splits the incoming stream of data into separate streams, and forwards the streams to either the rendering system 417, the zideo decoder 418, or to the local camera 431 within the user interface 430.

If geometric models are being sent to the client 403, the streamed three-dimensional geometry 411 and the camera parameters 412, are sent to the client's rendering system 417. The geometry is then rendered on the client 403 using the camera 420, and the framebuffer is read to compute the output: the RGB (red, green, blue) color image values 421 and the z-buffer information 422. The outputs are then sent to the compositor 419.

If zideo 410 has been sent to the client 403, it is forwarded by the splitter 416 to the decoder 418. The decoder 418 separates the RGB image values 423 from the z-buffer information 424, and passes the output to the compositor 419. In the case of server-only rendering, the zideo 410 would not contain any z-buffer information and the video sent from the server would be sent immediately to the compositor 419.

If camera parameters 412 are sent to the client, the splitter 416 also forwards these parameters to the user interface 430. The compositor 419 accepts as input the image 421 and z-buffer information 422 from the client rendering system 417, image 423 and the z-buffer information 424 from the server. It is not necessarily the case that all of these input values are actually present all of the time. In server-only rendering, the compositor 419 would only accept the image 423 from the decoder 418. For client-only rendering, the compositor 419 would only need to accept the image 421 from the client rendering system 417. In these extreme cases, the compositor 419 has little to do other than to pass the final image 435 along to the display 432 for the user to see. It is only when the synthetic content is a combination of server and client rendering that the compositor 419 has actual work to do. In this case, the compositor 419 needs to determine, for each pixel in the final image that will be displayed for the user, whether to use the corresponding pixel generated on the server 401 or on the client 403. This decision is based upon several factors, including the z-buffer information 426 and 428, and the relationship between camera parameters on the server 412 and the client 420.

If the camera parameters 412 on the server 401 and the client 403 are within a specified tolerance level, then the z-buffer information 426 and 428 will typically be used to determine whether to use the server 401 or the client 403 rendered pixel. However, if there is a significant difference in the camera parameters, the system can choose to ignore the server-rendered images, and only display the client-rendered images to prevent the user from becoming disoriented.

The output of the compositor 419 is an image 435 presented to the user on the computer display 432. The user interface 430 is a mechanism for the user to send feedback 414 to the server. For example, if the user wishes to visualize the geometric models from a different viewpoint, updated camera parameters can be sent back to the server 401. Additional information can also be passed back to the server 401 through this interface. Feedback 414 sent from the client 403 to the server 401 is further discussed in FIGS. 6 and 7.

Figure 5:
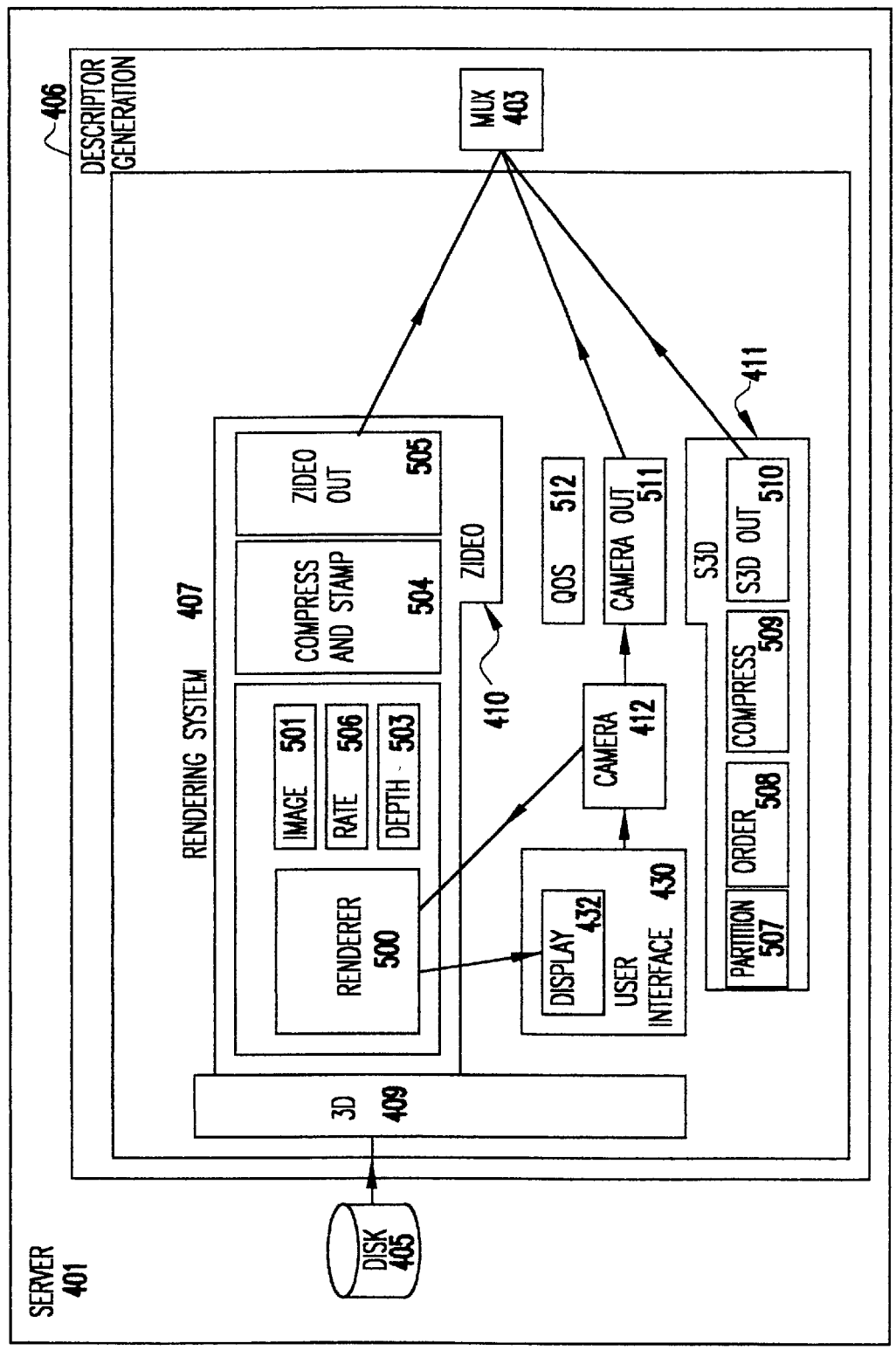
FIG. 5 is a block diagram showing the descriptor generation component of the invention.

FIG. 5 is a block diagram showing the descriptor generation component 406 of the current invention. Recall that the server 401 is comprised of a disk 405 used to store geometric models, and a descriptor generating system 406, for generating synthetic content to be sent across a computer network 402. The descriptor generating system 406 is further broken down into a rendering system 407 and a multiplexer 408, which is used for combining the zideo 410, s3d 411, and camera outputs 412 produced by the rendering system 407.

The rendering system 407 contains a three-dimensional facility 409 for processing scenes of three-dimensional geometric models. The three-dimensional facility 409 manages the data that is being visualized, by loading it into the main memory of the computer and by handling requests from clients who may wish to make modifications, e.g., transformations, to the scene of geometric models. The three-dimensional facility 409 also passes the geometric data to the "zideo" system 410 and the three-dimensional system 411.

Using the camera parameters 412 of the server 401, the renderer 500 of zideo system 410 renders geometric models passed to it by the three-dimensional facility 409. The rendered images 501 may then be sent to the computer display 432 on the client 403, although this is not required. After the geometry has been rendered, the framebuffer is read and the RGB image 501 and the z-buffer, or depth, information 503 is passed to the zideo system's compress and stamp subsystem 504. The compress and stamp subsystem 504 is responsible for timestamping the information that is being passed from the renderer 500 and eventually to the multiplexer 408. The timestamping is required to enable the client 403 to synchronize the data that is being received over the network 402. The image 501 and z-buffer information 503 can also be compressed to reduce the bandwidth required across the network 402. After timestamping and compression are done, the output of the zideo system, called "zideo" out 505, is passed to the multiplexer 408. The rate 506 functionality is provided as a means for the compress and stamp subsystem 504 to pass feedback to the renderer 500, for instance, if the images 501 are being passed too quickly for the compressor 504 to keep up.

The three-dimensional system 411 generates streamed three-dimensional geometry. Initially the geometry is passed to the three-dimensional system 411 from the three-dimensional facility 409. The geometry is then partitioned 507 into smaller pieces of data which are then ordered 508 according to a priority scheme, which may or may not be influenced by the client 403. Once the pieces of data have been partitioned 507 and ordered 508, they may be compressed 509 and sent as three-dimensional out 510 to the multiplexer 408.

The camera out system 511 passes the parameters describing the server camera, in block 412, to the multiplexer 408 to be sent to the client 403. The camera 412 is required by the renderer 500 and may optionally be modified on the server 401, although typically this is not the case.

A quality of service, or QOS, system 512 is part of the descriptor generating system 406 also. The QOS system 512 interprets some of the feedback 414 sent from the client 403 to the server 401. The QOS system 512 can influence the rendering system 407, by going through the compress and stamp subsystem 504 and the rate function mechanism 506, and also the three-dimensional system 411. For example, when sending images across a network, there is typically a tradeoff between fidelity and frame rate. In other words, high quality images require more time to produce and therefore the number of images sent in a fixed amount of time, also called the frame rate, decreases. Similarly, low quality images can be produced much faster and therefore the client receives images at a much higher frame rate. Thus, one form of feedback from the client would be to indicate the desired quality of the images it wishes to receive, or the frame rate at which it would like to receive the images.

Figure 6:
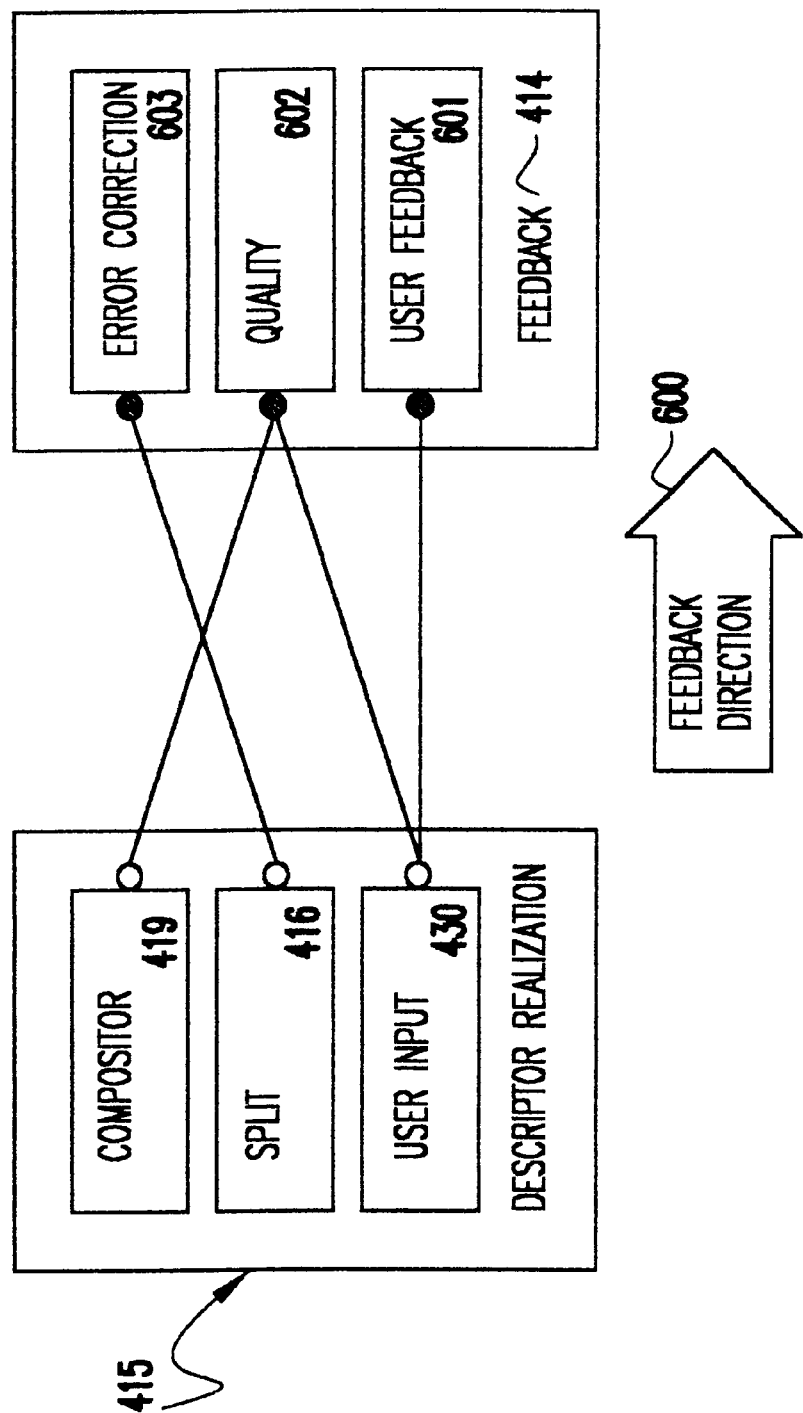
FIG. 6 is a block diagram showing the client feedback components in the invention.

FIG. 6 is a block diagram showing the client feedback components in the current invention. The feedback direction 600 indicates that the feedback 414 is from the client 403, in particular the descriptor realization system 415, to the server 401. Within the descriptor realization system 415, there are three systems that can provide feedback to the server: the compositor 419, the demultiplexer 416, and the user interface mechanism 430. The compositor 419 can effect the quality 602 of the descriptors 413 that are being sent to the client 403. For example, the compositor 419 knows at what frame rate 506 the images 435 are being displayed for the user, and therefore the compositor 419 can inform the server 401 that it should send images 501 faster if it is not keeping up with the current frame rate. The demultiplexer or splitter 416 sends feedback to the server 401 in the form of error correction 603. This particular feedback mechanism is prior art and involves the reliable delivery of content from the server 401 to the client 403. The reliable delivery can be accomplished, for example, by using TCP (Transmission Control Protocol) or using reliable UDP (User Datagram Protocol). The user input mechanism 430 also affects the quality 602 of the descriptors 413 sent to the client 403, as well as traditional user feedback 601 in which the camera position is modified by the client 403. There are additional scenarios in which user feedback 601 is sent to the server 401, and these are discussed in FIG. 7. The quality feedback 602 can also allow the user to specify to the server 401 whether to send better quality images or additional geometry to be rendered locally.

Figure 7:
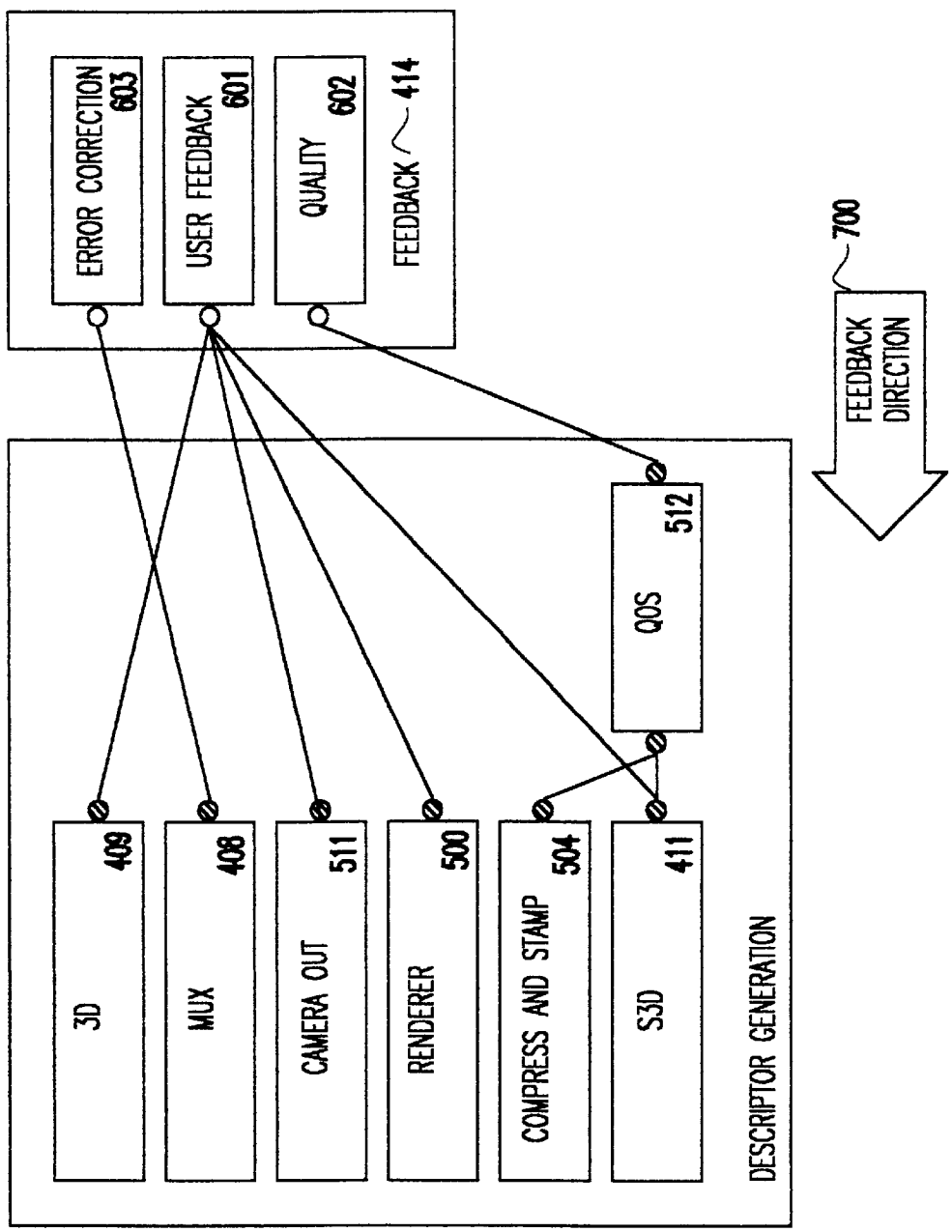
FIG. 7 is a block diagram showing the server components responsible for processing the client feedback.

FIG. 7 is a block diagram showing the server components responsible for processing the client feedback 414. The direction of feedback 700 continues to point from the client 403 to the server 401. As indicated originally in FIG. 6, the three categories of client feedback are error correction 603, user feedback 601, and quality 602. The error correction feedback 603, involving prior art reliable delivery requirements, is handled by the multiplexer 408. User feedback 601 is passed back to a multitude of systems, described as follows. The user can indicate a change in the geometric model scene, for example by transforming the location of a particular model. Such a request is handled by the three-dimensional facility 409. The user can modify the camera parameters which is processed by the camera out system 511. A request to change the size or resolution of the image would be processed directly by the renderer 500. The final type of user feedback 601 consists of requests for specific components of the geometric models to be sent from the server 401 to the client 403, if, for instance, the client 403 wishes to inspect a particular part of a larger assembly. Such requests are handled by the three-dimensional system 411. Quality is handled by the quality of service (QOS) mechanism 512. The QOS mechanism 512 communicates with the compress and stamp subsystem 504 and the three-dimensional system 411.

Figure 8A:
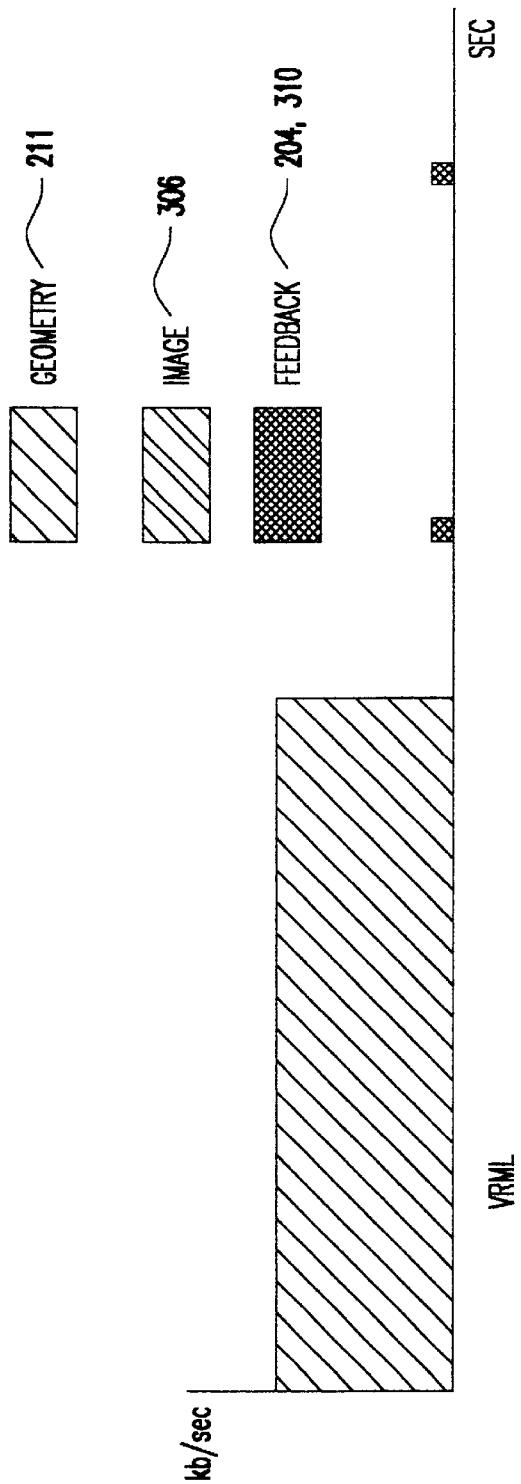
FIGS. 8A is a diagram illustrating prior art client rendering bandwidth requirements.
Figure 8B:
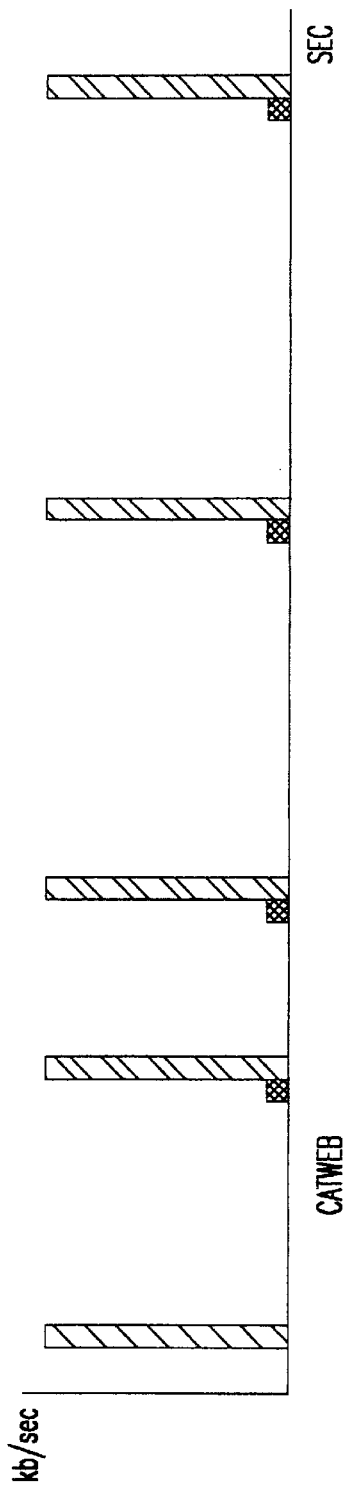
FIG. 8B is a diagram illustrating prior art server rendering bandwidth requirements

FIG. 8A is a diagram illustrating prior art bandwidth requirements for client rendering. The Virtual Reality Modeling Language, or VRML, approach involves client-only rendering. Three elements are traditionally sent across the network in the prior art: geometry 211, image 306, and feedback 204. The geometric models 211 are sent across the network 203 and the client 202 must wait until all information has been received, unless clever progressive transmission strategies have been used. Once the geometry is located locally and is being rendered on the client 202, only occasional feedback 204 to the server is necessary. In the other extreme, shown in FIG. 8B, that of server-only rendering, the CATWeb approach sends images 306 to the client 301 occasionally, only after receiving feedback 310 from the client 301 to indicate, for example, a change in camera parameters, or a request to visualize a different geometric model.

Figure 2:
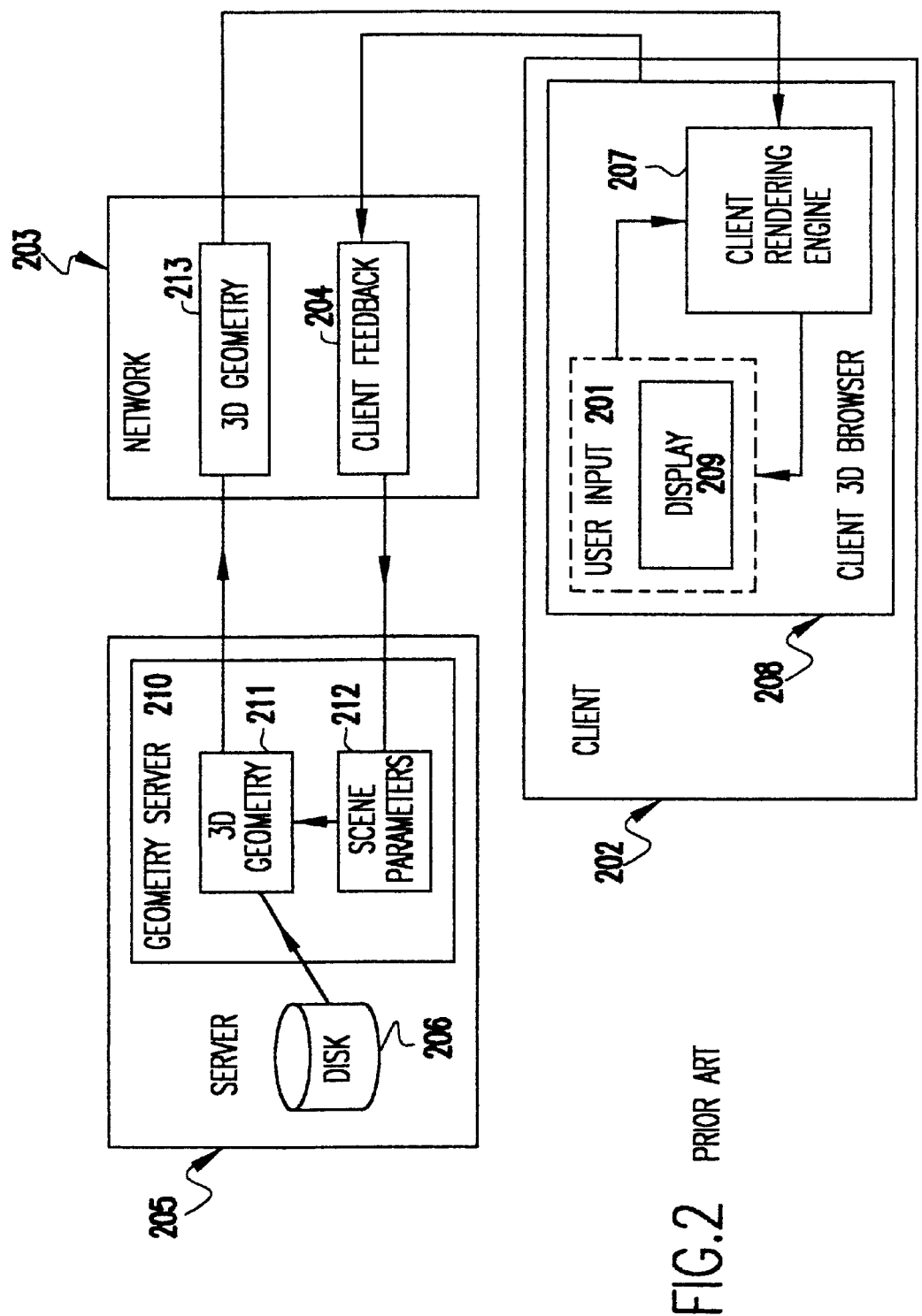
FIG. 2 is a block diagram showing prior art of client-side rendering.
Figure 3:
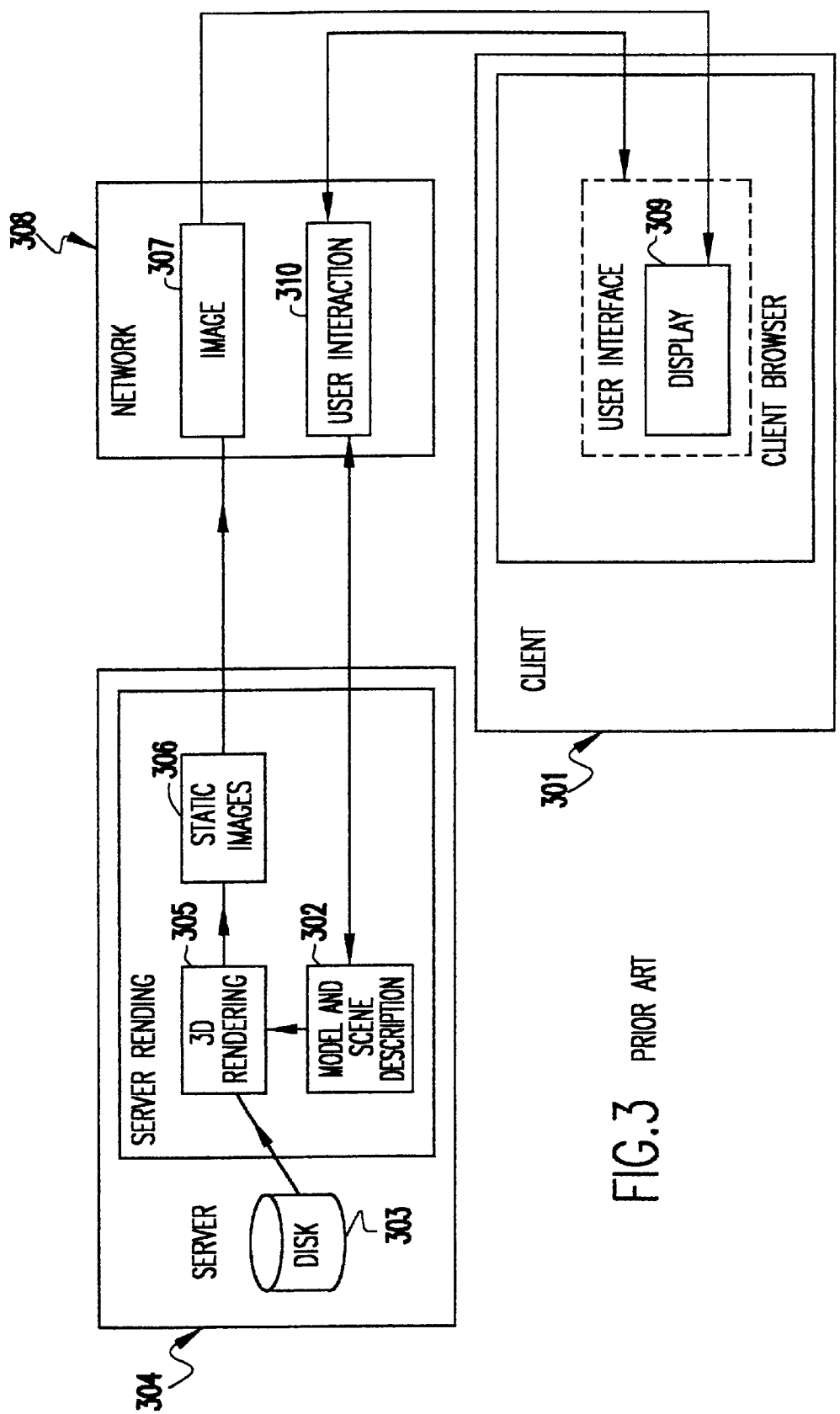
FIG. 3 is a block diagram showing prior art of server-side rendering.

FIG. 9A is a diagram illustrating bandwidth requirements for the present invention. Three elements are sent across the network in the present invention: streamed geometry 411, zideo 410, and feedback 414. As shown in FIG. 9A, the server-only rendering approach within the present invention is identical to that of the CATWeb approach of FIG. 8B. Images 501 are sent to the client 403 occasionally, only after receiving feedback 414 from the client. The client-only rendering, shown in FIG. 9C, in the present invention is different than the prior art described in FIGS. 2 and 8A. In this case, a combination of zideo 410 and streamed geometry 411 is sent to the client 403 so that some visualization can occur immediately. Once all of the streamed geometry 411 has been obtained by the client 403, no further information is needed from the server 401. In between the two extremes, the server and client renderings can be mixed, as shown in FIG. 9B. Images 501 and depth information portion of zideo 503 are initially sent with streamed geometry 411 until all of the desired geometry has been loaded on the client 403. Then, only zideo 410 is sent to augment the client-side rendering, as determined by the feedback 414 sent to the server 401.

Figure 10:
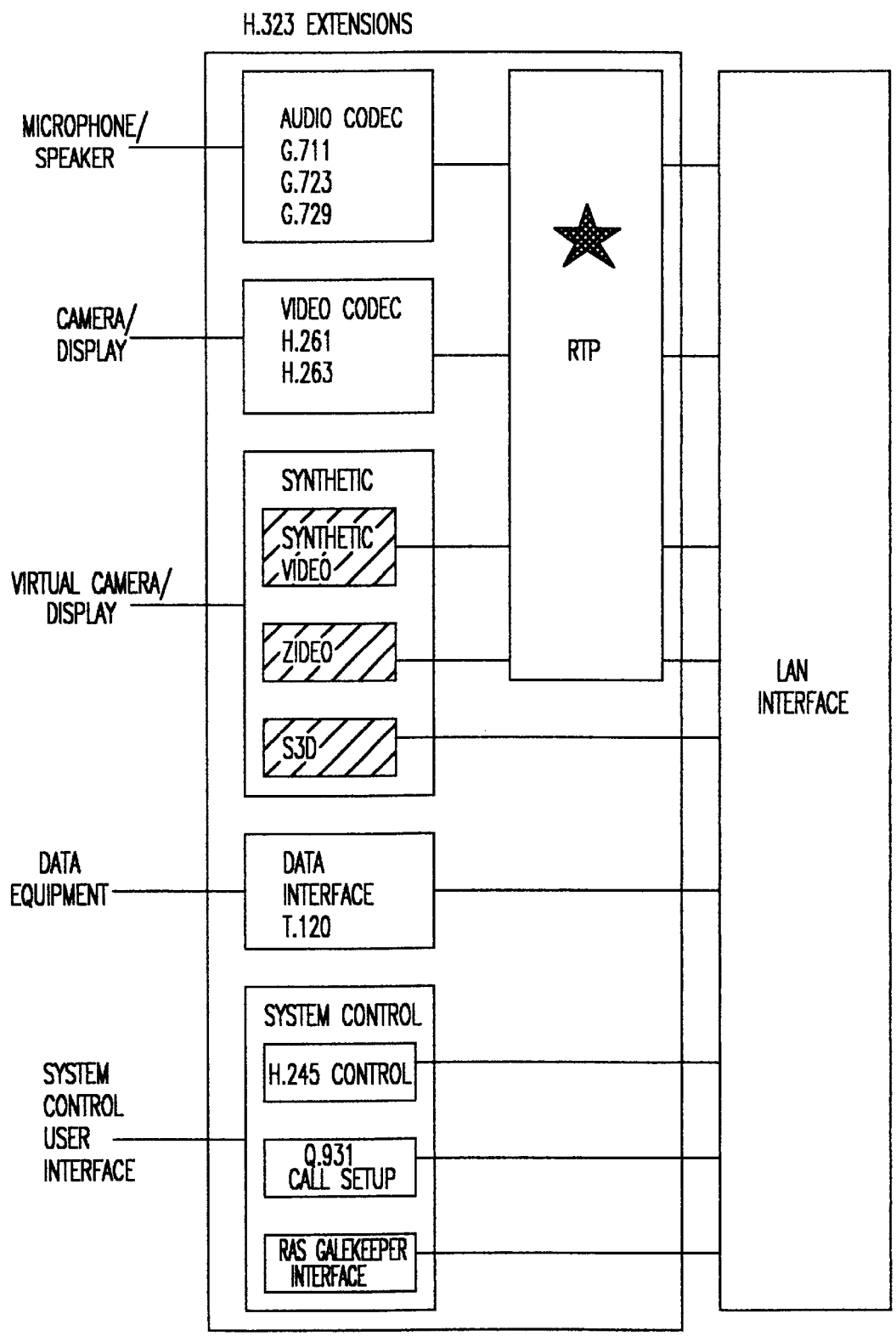
FIG. 10 is a block diagram defining H.323 extensions.

FIG. 10 is a block diagram which highlights a possible extension to the H.323 standard. The International Telecommunications Union (ITU) is an organization that sets standards for multimedia communications. H.323 is a well-established standard within the community of audio, video, and data communications across networks such as the Internet. The shaded region in FIG. 10 shows a possible extension to the H.323 standard, whereby using the present invention, sending synthetic content, such as zideo and geometry, could also be included in the standard.

Figure 11:
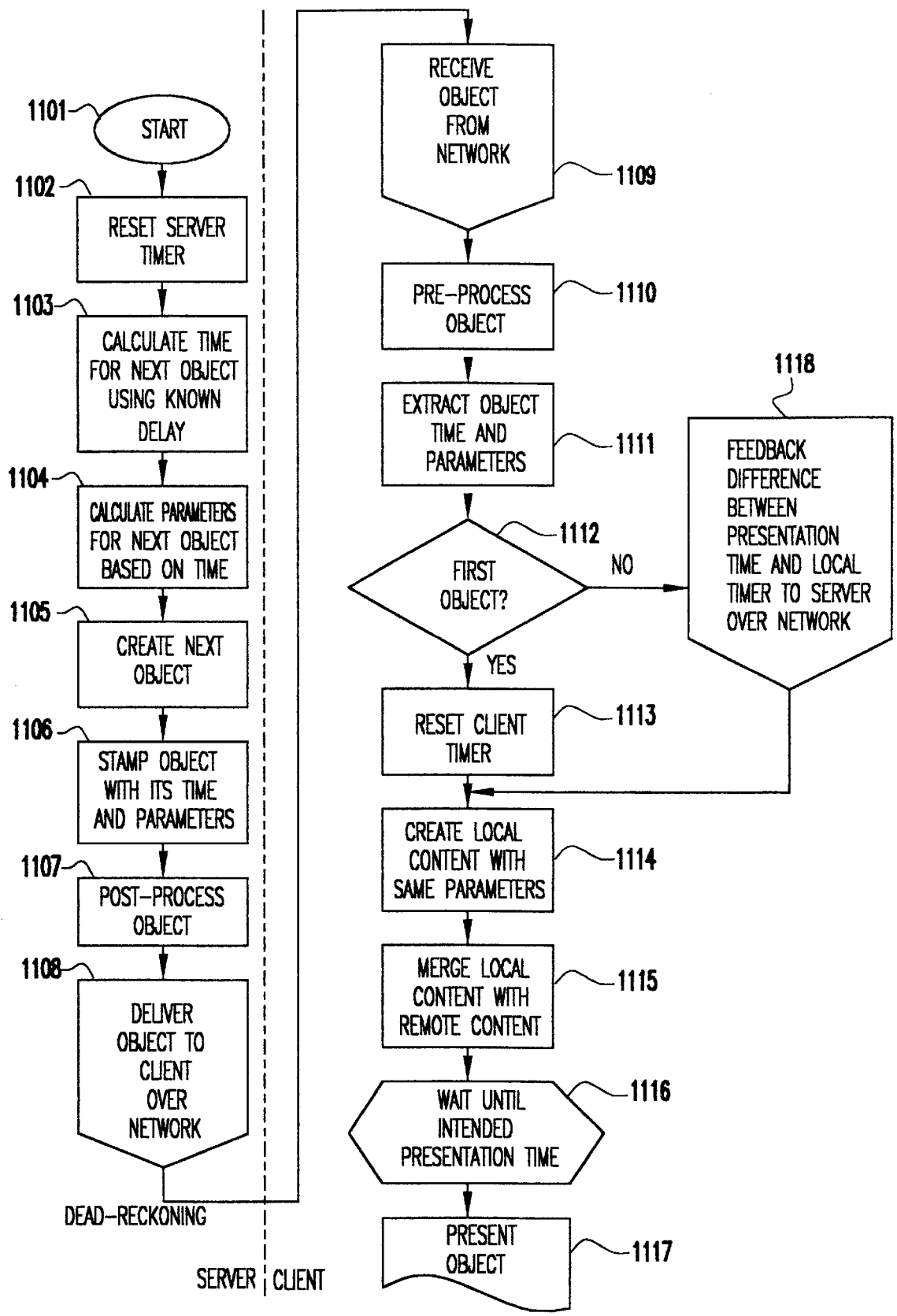
FIG. 11 is flow chart of the dead reckoning process.

FIG. 11 is a flow chart of the dead reckoning process based on the presence of clocks on the server and client. Initial synchronization occurs when streaming begins at the server and the server clock is reset to zero 1102 prior to content creation, compression, and transmission. The client clock is reset 1113 after fully receiving and decompressing the first frame. The client and server clocks are therefore not synchronized in real time, but content created for display at time, T, and time stamped accordingly will automatically be available at time T of the client's clock after transmission and decompression. An error signal can thereafter be fed back from the client to the server indicating the error in the arrival time of a frame and its time stamp, allowing dynamic modifications to the server clock to keep its delivery of media in synch with the client.

When interaction occurs on the client side, the gesture and its client time stamp are sent to the server and used in a predictor algorithm to begin tracking the motion requested. Network delays on both trips between client and server will be accommodated and the media streamed from the server to the client, after a brief delay, will by in synch with the requested motion.

More specifically, steps 1101–1108 illustrate the steps done on the server side. The process starts 1101 after initiation by the server or upon request from the client. In function block 1102, the server timer is reset. In function block 1103, the time is calculated for the next object using known delay. Initially this is approximate, but once feedback 1118 begins arriving from the client this value will be refined. Then, in function block 1104, parameters are calculated for the next object based on its anticipated presentation time. This includes the time it takes the server to create the object and the time it takes to deliver the object to the client. In function block 1105, the object is created using the parameters calculated in 1104. In function block 1106, the object is stamped with its time and other parameters. In function block 1107, any post-processing of the object, such as compression, is done. Then, in step 1108, the object is delivered to the client over network.

Steps 1109–1117 show the steps on the client side. In step 1109, the client receives object from the network, and pre-processes the object in function block 1110. In function block 1111, the client extracts time and other properties associated with object. In decision block 1112, a determination is made whether the object received is the first object. If the object received is the first object, then the client timer is reset in function block 1113. The server resets its timer before creating the first object, and the client reset its timer on receipt of the first object. If the object is not the first object, then in step 1118, the difference between the presentation time stamped on the object and the actual local time the object was ready for presentation is fed back to the server over the network. Then, in function block 1114, local content is created with the same parameters, which is to be embedded in the server content. In function block 1115, the local content is merged with the remote content. In step 1116, the client waits until the intended presentation time. Then, in step 1117, the scene containing merged content from the client and the server is displayed.

Figure 12:
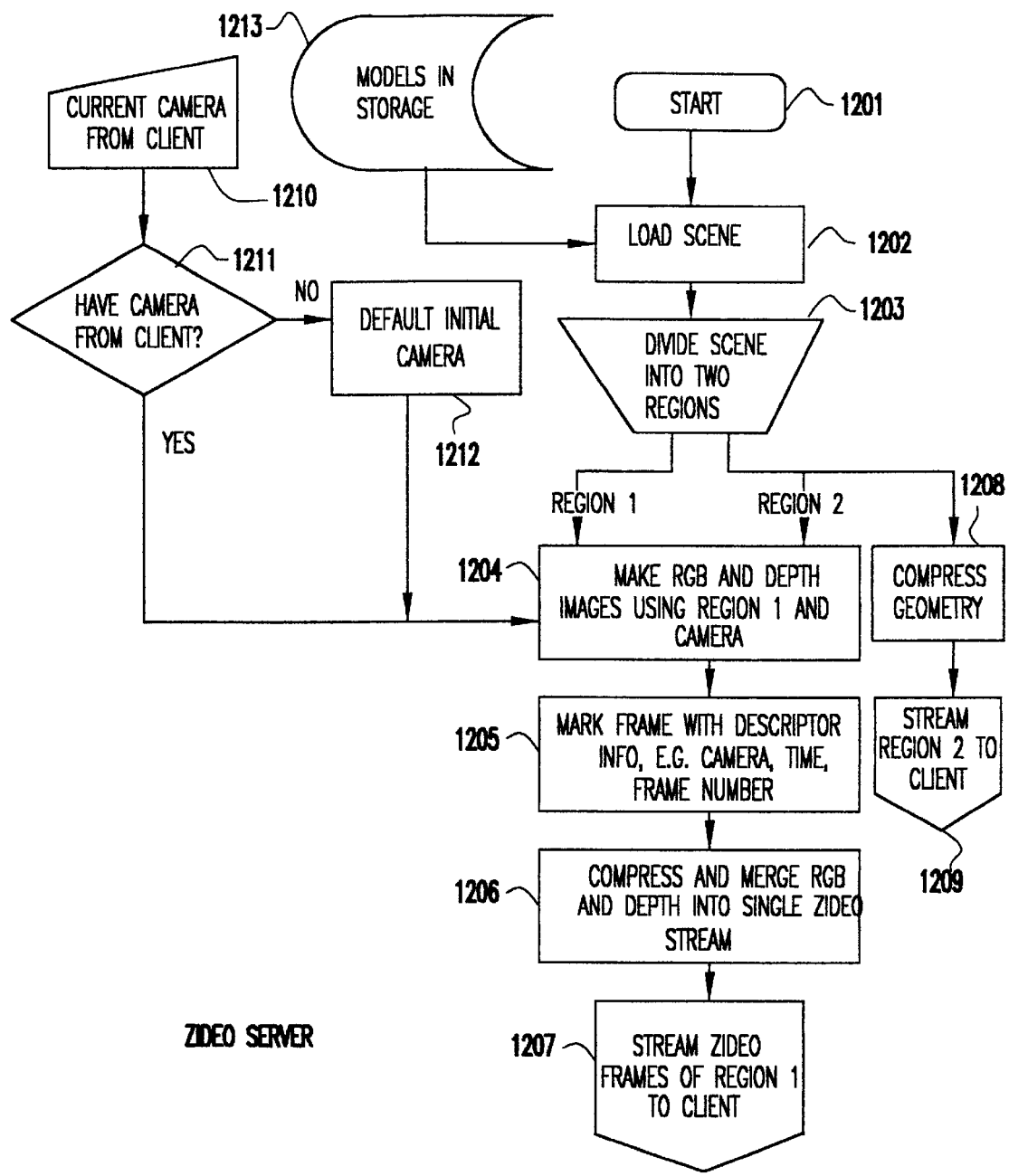
FIG. 12 is a flow chart of the "zideo" server.

FIG. 12, shows a flow chart of the Zideo Server process. The process starts in step 1201, and is initiated either by the server or upon request from the client. In function block 1202, the scene is loaded from models in storage 1213. In step 1203, the scene is divided into two regions, one of which will be sent as geometry to the client 1208, and the other will be remain on the server and be sent as RGB image plus depth 1204. In decision block 1211, a determination is made whether there is a camera available from the client 1210. If yes, the current camera from the client 1210 is used. Otherwise, a default initial camera 1212 is used. In function block 1204, using the camera from 1210 or 1212, and region 11204, an RGB and depth image of the scene is created. In function block 1205, the frame is marked with descriptor information such as the camera used, time, and frame number. In function block 1206, RGB and depth are compressed and merged into single zideo image. Then, in step 1207, zideo frames of region 1 are streamed to the client. In function block 1208, the geometry for region 2 is compressed, and streamed to the client 1209 until it has all been sent.

Figure 13:
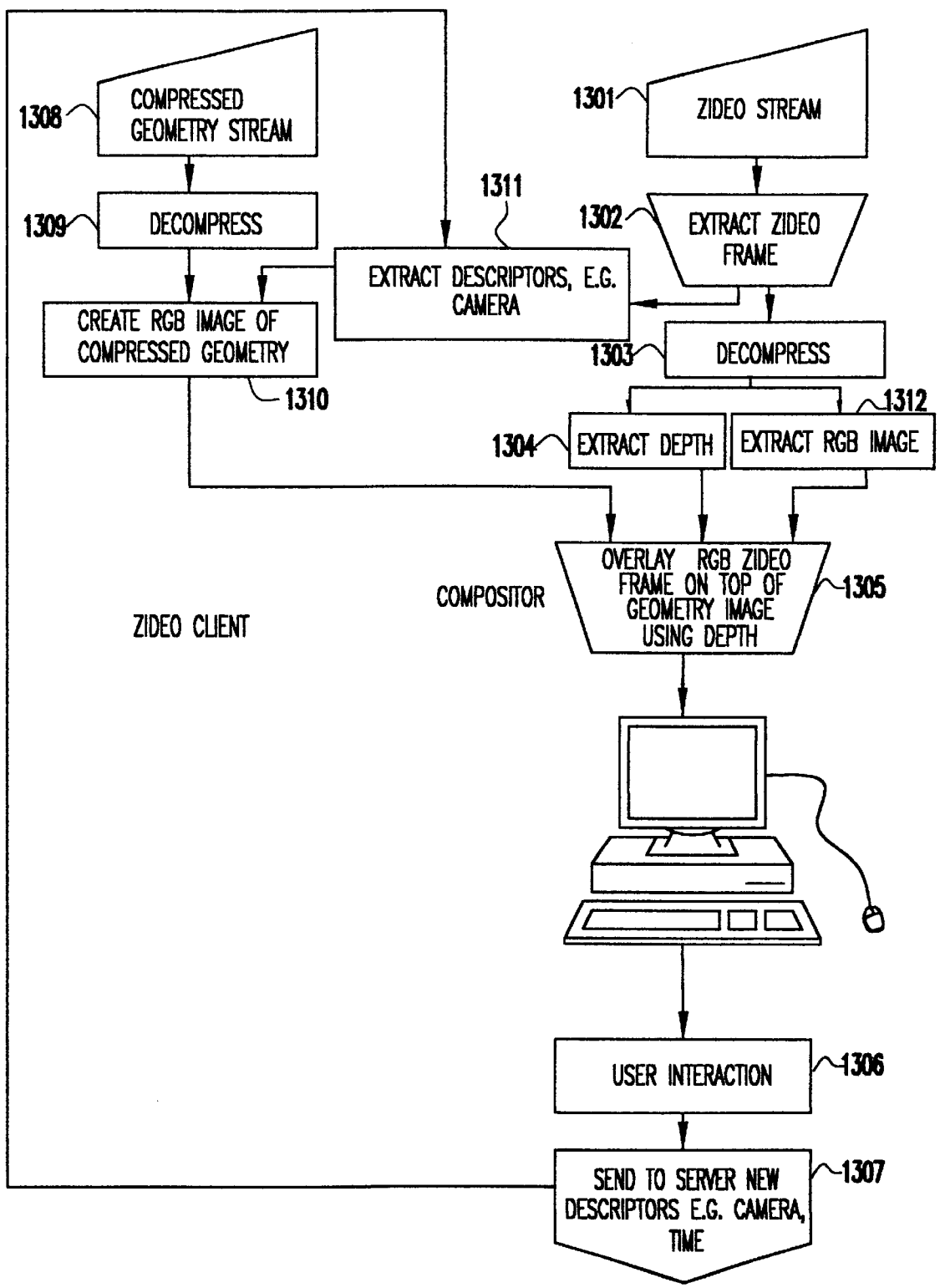
FIG. 13 is a flow chart of the "zideo" client.

FIG. 13 shows a flow chart of the process of the Zideo Client. In step 1301, the client receives zideo stream from the server. In function block 1302, the compressed zideo frames are extracted as the stream arrives. In function block 1303, the RGB and depth information are decompressed, and the depth 1304 and RGB image 1312 are extracted. In function block 1311, descriptors from the zideo frame, e.g. camera parameters, are extracted. In function block 1309, the compressed geometry stream 1308 from the server is decompressed. In function block 1310 an RGB image is created of the compressed geometry stream 1308. The current camera is utilized if there is one; otherwise the camera used by the server to create the zideo is used. In step 1305, the RGB zideo frame is overlaid on top of the geometry image created by 1310 using depth. This can be done by explicitly comparing the depth values of the two images and using whichever pixel is closer, or by directly rendering the compressed geometry into the RGB+depth frame. In function block 1306, user interaction with the scene makes the camera parameters change due to rotation, zooming, etc. In step 1307, the new camera parameters are sent back to the server for use in the following zideo frame renderings, and fed back to 1311 so that the new local camera is used to render the compressed geometry stream in 1310.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer imaging system comprising:

a central processing unit (CPU), at least one memory, and a network interface to one or more networks;

at least one scene model stored in said at least one memory, each said at least one scene model having at least one first part and at least one second part, each said at least one first part having a first three-dimensional geometric model and each said at least one second part having a second three-dimensional geometric model;

means for converting the first three-dimensional geometric model into a first two-dimensional image with depth information;

means for providing the position of the first two-dimensional image with respect to the second three-dimensional geometric model; and means for transmitting the second three-dimensional model, the first two-dimensional image, the depth information, and the position of the first two-dimensional image with respect to the second three-dimensional geometric model through the network interfaces to the network.

2. The computer imaging system according to claim 1, wherein said converting means and said position means reside on a server.

3. The computer imaging system according to claim 2, wherein said position means provides at least one of the following position parameters: a viewpoint, an orientation, a width, a depth, and a range.

4. The computer imaging system according to claim 1, wherein the transmitting means further transmits the first three-dimensional geometric model.

5. The computer imaging system according to claim 1, wherein a client receiving at least the second three-dimensional geometric model, the first two-dimensional image, the depth information, and the position of the first two-dimensional image with respect to the second three-dimensional geometric model transmits a quality of service message to the server via the network interface.

6. The computer imaging system according to claim 5, where the quality of service message includes at least one of a stop, a request for a faster frame rate of the first two-dimensional image, a request for a faster frame rate of the depth information, an improved resolution of the first two-dimensional image, a request for a slower frame rate of the first two-dimensional image, a request for a slower frame rate of the depth information, a lower resolution of the first two-dimensional image, a bit rate for the first 3-dimensional geometric model, a delay message, and a delay message that controls a clock.

7. The computer imaging system as recited in claim 6 further comprising means for merging geometry rendered locally on the client with the depth information received from the server based on the depth value for each pixel.

8. The computer imaging system as recited in claim 7 further comprising means for compressing and streaming the client-rendered scene geometry that allows reconstruction of the geometry by the client as the streamed geometry stream arrives.

9. The computer imaging system as recited in claim 8 further comprising means for compressing a color and depth image stream by one or more of the following:
   intraframe compression of the color and depth independently as individual frames;
   interframe compression of the color and depth as separate animations; and
   interframe compression of the color and depth joined together into a single animation of the color and depth frames side by side or top to bottom.

10. The computer imaging system as recited in claim 9 further implementing a dynamic compression mode and comprising:
   means for the server to determine whether client view parameters and scene contents are changing;
   means for the server to begin sending individual frames that have successively higher resolution in at least one of color or depth;
   means for the server to begin sending frames that, when merged, produce a progressively higher and higher resolution in at least one of color or depth; and
   means for the server to detect changes in client view parameters or scene contents and begin streaming low resolution color and depth frames.

11. The computer imaging system as recited in claim 10 further comprising:
   means for providing user interaction commands with each of said at least one scene model;
   means for communicating the user interaction commands to the server;
   means for enabling the server to communicate to the client a depth range of each frame to allow merging the client-rendered scene geometry into the server-rendered frames; and
   means for the server to communicate to the client the view parameters of each frame.

12. The computer imaging system as recited in claim 11 wherein the view parameters include at least one of view point, view orientation, view frustum, and use of perspective.

13. The computer imaging system as recited in claim 12 further comprising means for synchronizing client and server content and accommodating latency due to at least one of network delays, compression time, and decompression time.

14. The computer imaging system as recited in claim 13, wherein said synchronizing means comprises:
   independently running client and server clocks;
   means for initially synchronizing said client and server clocks to accommodate latency on the server, network, and client;
   means for the server to communicate to the client a timestamp for each frame that aids in synchronizing frames that arrive on time, and rejecting or delaying frames that do not arrive on time; and
   means for providing feedback from the client to the server regarding the measured error in the arrival time of the frames and their timestamp to dynamically adapt to latencies in the system and their changes.

15. The computer imaging system as recited in claim 13 further comprising:
   a user interaction mode that allows predictive rendering by the server; and
   means for the server to compensate for client-server latency by using a deduced time lag and said user interaction mode to pre-render images so they arrive at the client on time.

16. The computer imaging system as recited in claim 15, wherein said user interaction mode enables a user to interact with respect to at least one of rotation about an axis, motion along a path through space, panning, and zooming.

17. A computer implemented method for interactively using three dimensional models across a network, comprising the steps of:
   storing at least one scene model stored in at least one memory of a computer, wherein each said at least one scene model has at least one first part and at least one second part, and each said at least one first part has a first three-dimensional geometric model and each said at least one second part has a second three-dimensional geometric model;
   converting the first three-dimensional geometric model into a first two-dimensional image with depth information;
   providing the position of the first two-dimensional image with respect to the second three-dimensional geometric model; and
   transmitting the second three-dimensional geometric model, the first two-dimensional image, the depth information, and the position of the first two-dimensional image with respect to the second three-dimensional geometric model through the network interfaces to the network.

18. The computer implemented system according to claim 17, wherein said converting means resides on a server.

19. The computer implemented method as recited in claim 17, wherein the step of providing the position of the first two-dimensional image with respect to the second three-dimensional geometric model provides at least one of the following position parameters: a viewpoint, an orientation, a width, a depth, and a range.

20. The computer implemented method as recited in claim 17, wherein the transmitting step further transmits the first three-dimensional geometric model.

21. The computer implemented method as recited in claim 17, further comprising the step of transmitting a quality of service message to the server via the network interface.

22. The computer implemented method as recited in claim 21, wherein the quality of service message includes at least one of: a stop, a request for a faster frame rate of the first two-dimensional image, a request for a faster frame rate of the depth information, an improved resolution of the first two-dimensional image, a request for a slower frame rate of the first two-dimensional image, a request for a slower frame rate of the depth information, a lower resolution of the first two-dimensional image, a bit rate for the first three-dimensional geometric model, a delay message, and a delay message that controls a clock.

23. The computer implemented method as recited in claim 22, further comprising the steps of:
   streaming the geometry of all, part, or none of each of said at least one scene model from a remote server machine to a local client machine;

streaming two-dimensional animations of all or part of each of said at least one scene model from the server to the client in a form that includes a depth value for each pixel.

24. The computer implemented method as recited in claim 23 further comprising the step of merging geometry rendered locally on the client with the depth information received from the server based on the depth value for each pixel.

25. The computer implemented method as recited in claim 24 further comprising the step of compressing and streaming the client-rendered scene geometry for allowing reconstruction of the geometry by the client as the streamed geometry stream arrives.

26. The computer implemented method as recited in claim 24 further comprising the step of compressing a color and depth image stream.

27. The computer implemented method as recited in claim 26, wherein the color and image stream are compressed by one or more of the following techniques:
intraframe compression of the color and depth independently as individual frames;
interframe compression of the color and depth as separate animations; and
interframe compression of the color and depth joined together into a single animation of the color and depth frames side by side or top to bottom.

28. The computer implemented method as recited in claim 26 further comprising the steps of:
determining whether client view parameters and scene contents are changing;
prompting the server to begin sending individual frames that have successively higher resolution in at least one of color or depth;
prompting the server to begin sending frames that, when merged, produce a progressively higher and higher resolution in at least one of color or depth; and
detecting changes in client view parameters or scene contents and begin streaming low resolution color and depth frames.

29. The computer implemented method as recited in claim 28 further comprising the steps of:
providing user interaction commands with each of said at least one scene model;
communicating the user interaction commands to the server;
enabling the server to communicate to the client a depth range of each frame to allow merging the client-rendered scene geometry into the server-rendered frames; and
communicating to the client the view parameters of each frame.

30. The computer implemented method as recited in claim 29 wherein the view parameters include at least one of: view point, view orientation, view frustum, and use of perspective.

31. The computer implemented method as recited in claim 30 further comprising the step of synchronizing client and server content and accommodating latency due to at least one of network delays, compression time, and decompression time.

32. The computer implemented method as recited in claim 31, wherein said synchronizing means comprises:
providing independently running client and server clocks;
synchronizing said client and server clocks to accommodate latency on the server, network, and client;
communicating to the client a timestamp for each frame that aids in synchronizing frames that arrive on time, and rejecting or delaying frames that do not arrive on time; and
providing feedback from the client to the server regarding the measured error in the arrival time of the frames and their timestamp to dynamically adapt to latencies in the system and their changes.

33. The computer implemented method as recited in claim 31 further comprising the step of:
providing a user interaction mode that allows predictive rendering by the server; and
compensating for client-server latency by using a deduced time lag.

34. The computer implemented method as recited in claim 33, wherein the step of providing the user interaction mode enables a user to interact with respect to at least one of: rotation about an axis, motion along a path through space, panning, and zooming.

35. A computer program product comprising a computer usable medium having computer readable program code embodied in the medium for processing digital images, the computer program product having:
first computer program code for storing at least one scene model in at least one memory of a computer, wherein each of the at least one scene model has at least one first part and at least one second part, wherein each of the at least one first part has a first three-dimensional geometric model and each of the at least one second part has a second three-dimensional geometric model;
second computer program code for converting the first three-dimensional geometric model into a first two-dimensional image with depth information, wherein the depth information is used to determine whether the two-dimensional image is in front or behind the second three-dimensional geometric model;
third computer program code for providing the position of the first two-dimensional image with respect to the second three-dimensional geometric model; and
fourth computer program code for transmitting the second three-dimensional geometric model, the first two-dimensional image, the depth information, and the position of the first two-dimensional image with respect to the second three-dimensional geometric model through the network interfaces to the network.

36. A computer program product according to claim 35, further comprising: ninth computer program code for merging geometry rendered locally on the client with the depth information received from the server based on the depth value for each pixel.

37. A computer program product according to claim 36, further comprising:
tenth computer program code for compressing and streaming the client-rendered scene geometry that allows reconstruction of the geometry by the client as the streamed geometry stream arrives.

38. A computer program product according to claim 37, further comprising:
eleventh computer program code for compressing a color and depth image stream by one or more of the following:
intraframe compression of the color and depth independently as individual frames;
interframe compression of the color and depth as separate animations; and
interframe compression of the color and depth joined together into a single animation of the color and depth frames side by side or top to bottom.

* * * * *